(12) United States Patent
Wagle et al.

(10) Patent No.: US 10,030,189 B2
(45) Date of Patent: *Jul. 24, 2018

(54) SALT-FREE INVERT EMULSION DRILLING FLUIDS AND METHODS OF DRILLING BOREHOLES

(75) Inventors: Vikrant Bhavanishankar Wagle, Mumbai (IN); Dhanashree Gajanan Kulkarni, Pune (IN); Shadaab Syed Maghrabi, Thane (IN)

(73) Assignee: Halliburton Energy Services, Inc., Houston, TX (US)

( * ) Notice: Subject to any disclaimer, the term of this patent is extended or adjusted under 35 U.S.C. 154(b) by 472 days.

This patent is subject to a terminal disclaimer.

(21) Appl. No.: 13/602,684

(22) Filed: Sep. 4, 2012

(65) Prior Publication Data

US 2014/0066338 A1    Mar. 6, 2014

(51) Int. Cl.
*C09K 8/36* (2006.01)

(52) U.S. Cl.
CPC ..................... *C09K 8/36* (2013.01)

(58) Field of Classification Search
CPC ........ C09K 8/36; C09K 8/885; C09K 8/5753; C09K 2208/00; C09K 8/34; C09K 8/5755; C09K 8/588; C09K 8/20; C09K 8/428; C09K 8/467; C09K 8/52; C09K 8/536; C09K 8/582; C09K 8/685; C09K 8/805; C09K 8/90; C09K 8/80; C09K 3/00; C09K 3/30; C09K 5/00; C09K 5/045; C09K 8/00; C09K 8/035; C08H 6/00; C08L 97/005; Y10S 507/901; Y10S 507/922; Y10S 507/925; Y10S 507/926; E21B 21/003; E21B 43/16

See application file for complete search history.

(56) References Cited

U.S. PATENT DOCUMENTS

| | | | | |
|---|---|---|---|---|
| 3,125,517 | A * | 3/1964 | Voda | C09K 8/36 507/131 |
| 5,072,794 | A | 12/1991 | Hale et al. | |
| 5,198,416 | A | 3/1993 | Hale et al. | |
| 5,494,120 | A | 2/1996 | Hale et al. | |
| 5,905,061 | A * | 5/1999 | Patel | C09K 8/32 507/129 |
| 5,977,031 | A | 11/1999 | Patel | |
| 7,939,470 | B1 * | 5/2011 | Wagle | C09K 8/36 166/305.1 |
| 2001/0009890 | A1 * | 7/2001 | Patel | C09K 8/32 507/138 |
| 2011/0214864 | A1 * | 9/2011 | Maghrabi | E21B 43/16 166/294 |
| 2012/0097403 | A1 * | 4/2012 | Maghrabi | E21B 43/16 166/381 |
| 2013/0303410 | A1 * | 11/2013 | Wagle | C09K 8/36 507/128 |
| 2013/0303411 | A1 * | 11/2013 | Wagle | C09K 8/28 507/129 |
| 2014/0087976 | A1 * | 3/2014 | Wagle | E21B 43/16 507/129 |

FOREIGN PATENT DOCUMENTS

| | | |
|---|---|---|
| CA | 2451926 A1 | 6/2005 |
| WO | 2011110803 A1 | 9/2011 |

OTHER PUBLICATIONS http://en.wikipedia.org/w/index.php?title=Citric_acid&printable=yes downloaded on Oct. 23, 2014.*
https://en.wikipedia.org/wiki/Adipic_acid Oct. 3, 2017 downloaded on Oct. 3, 2017.*
S. Norris, Lime-free oil-base mud proves effective in high temperature, CO2 Environments, Oil & Gas Journal, dated Sep. 10, 2001; http://www.ogj.com/articles/print/volume-99/issue-37/drilling-production/lime-free-oil-bas . . . downloaded on Oct. 3, 2017.*
Tony Harlan, Paul Cate, John Sniatynski, Patrick Murphy, and Harry Dearing, Salt-Free Internal Phase Oil Mud Provides Improved Performance, presentation, Apr. 2006, nine pp., AADE-06-DF-HO-08, American Association of Drilling Engineers, Houston, Texas, United States.
Product Sheet for Lime from Anchor Drilling Fluids USA, Inc., 2001.
International Search Report issued in related International Application No. PCT/US2013/057763, dated Apr. 12, 2014 (3 pages).
International Preliminary Report on Patentability issued in related International Application No. PCT/US2013/057763, dated Mar. 19, 2015 (10 pages).
Dthce Action issued in related Eurasian Patent Application No. 201590416, dated May 30, 2016 (7 pages).

* cited by examiner

*Primary Examiner* — Kumar R Bhushan
(74) *Attorney, Agent, or Firm* — Tenley Krueger; Baker Botts L.L.P.

(57) ABSTRACT

An invert emulsion drilling fluid, and a method for the use thereof in drilling wellbores, with good rheological properties at high temperatures and pressures. One embodiment of the drilling fluids is free of organophilic clays and lignites, free of calcium chloride, and comprises glycerol in the internal phase, and a suspension agent comprising a combination of a fatty dimer diamine and a short chain acid, such as citric acid. In one embodiment, the base oil for the emulsion is a paraffin and/or mineral oil. The drilling fluids provide good rheological properties including good suspension of drill cuttings.

12 Claims, No Drawings

SALT-FREE INVERT EMULSION DRILLING FLUIDS AND METHODS OF DRILLING BOREHOLES

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to oil or synthetic fluid based invert emulsion drilling fluids which combine high ecological compatibility with good stability and performance properties. Most particularly, the invention relates to clay-free invert emulsion drilling fluids.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic fluid-based muds are normally used to drill swelling or sloughing shales, salt, gypsum, anhydrite or other evaporate formations, hydrogen sulfide-containing formations, and hot (greater than about 300 degrees Fahrenheit ("° F.")) holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such oils shall be understood to comprise invert emulsions.

Oil-based muds used in drilling typically comprise: a base oil (or synthetic fluid) comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Such additives commonly include organophilic clays and organophilic lignites. See H. C. H. Darley and George R. Gray, Composition and Properties of Drilling and Completion Fluids 66-67, 561-562 ($5^{th}$ ed. 1988). An oil-based or invert emulsion-based drilling fluid may commonly comprise between about 50:50 to about 95:5 by volume oil or oleaginous phase to water or aqueous phase.

Recent technology as described for example in U.S. Pat. Nos. 7,462,580 and 7,488,704 to Kirsner, et al., introduced "clay-free" invert emulsion-based drilling fluids, which offer significant advantages over drilling fluids containing organophilic clays. As used herein, the term "clay-free" (or "clayless") means a drilling fluid made without addition of any organophilic clays or lignites to the drilling fluid composition.

In conventional invert emulsion drilling fluids, and in the new "clay-free" invert-emulsion drilling fluids first described by Kirsner, et al., brine rather than pure water is used for the internal phase because the salts such as calcium chloride in the brine enable balancing of osmotic pressures during drilling through shales. That is, the salt helps keep the water activity of the drilling fluid the same as the water activity of the shale, thereby preventing the flow of water from the drilling fluid into the shales and thus avoiding swelling of the shales. The concentration of salt used in the internal phase depends on the activity of water present in the shales.

Use of high concentrations of chloride salts can give rise to disposal issues and environmental concerns and can also result in high conductivity which interferes with the sensitivity of induction logs during exploratory drilling. Alternative electrolytes, such as potassium acetate or formate, have been used, but these salts are often cost prohibitive and still limit induction log sensitivity. Other substitutes such as potassium chloride, sodium chloride and magnesium sulfate result in similar disposal issues.

Alcohols, particularly glycerols, polyglycerols, and cyclicetherpolyols have also been tried as an alternative to calcium chloride brines for the internal phase of conventional invert emulsion drilling fluids. An advantage of using alcohols in the internal phase is that much of the concern for the ionic character of the internal phase is no longer required. When water is not present in the system, hydration of the shales is greatly reduced. Alcohols can still interact with the clays of the shales but swelling is considered still significantly less than with water. Conventionally, the problem with using alcohols as an internal phase of an invert emulsion is that the invert emulsions tend to be less stable at the high temperatures commonly encountered in subterranean formations during drilling for hydrocarbons. This instability is believed to be due to the alcohols tending to separate or become insoluble at elevated temperatures. Even when more heat tolerant alcohols are employed, barite settling and an undesirably high filtrate rate indicating invert emulsion instability at high temperatures and high pressures have been observed.

Invert emulsion-based muds or drilling fluids (also called invert drilling muds or invert muds or fluids) comprise a key segment of the drilling fluids industry, but they are increasingly being subjected to greater environmental restrictions and performance and cost demands. The complexities and unpredictability of the interaction and behavior of the fluid components with each other and with the conditions encountered during drilling makes meeting these demands challenging. There is a continuing need and thus ongoing industry-wide interest in new drilling fluids that provide improved performance while still affording environmental and economical acceptance.

SUMMARY OF THE INVENTION

The present invention provides an invert emulsion drilling fluid, and a method for the use thereof in drilling wellbores. That is, the drilling fluid of the invention comprises a salt-free internal phase and a suspension agent comprising a hydrophobic amine, such as a dimer diamine or fatty dimer diamine, and a short chain organic acid. The salt-free internal phase comprises an aqueous alcohol, such as glycerol. The base oil for the emulsion in one embodiment is a paraffin and/or mineral oil. The drilling fluid is also "clay-free," that is, it is made without addition of any organophilic clays or organophilic lignites to the drilling fluid composition. The drilling fluid is also made without the addition of calcium chloride or similar salts.

As used herein, the term "drilling" or "drilling wellbores" shall be understood in the broader sense of drilling operations, which includes running casing and cementing as well as drilling, unless specifically indicated otherwise. The method of the invention comprises using the drilling fluid of the invention in drilling wellbores. During drilling, the drilling fluid is not dependent on organophilic clays (also called "organo-clays") to obtain suspension of drill cuttings or other solids at rest, and lacks a significant (if any) pressure spike upon resumption of drilling.

The drilling fluid of the invention provides the advantages of an organophilic clay-free system as well as high pressure, high temperature (HTHP) stability. While some organophilic clay may enter the fluid in the field, for example, due to mixing of recycled fluids with the fluid of the invention, the fluid of the invention is tolerant of such clay in insubstantial quantities, that is in quantities less than about three pounds per barrel. The fluid of the invention, however, behaves more like a traditional drilling fluid when more than about three pounds per barrel of organo-clays are present. Similarly, the fluid of the invention is tolerant of calcium chloride and similar salts that may enter the fluid in insubstantial quantities.

DETAILED DESCRIPTION OF PREFERRED EMBODIMENTS

In one embodiment, the present invention provides an invert emulsion drilling fluid that meets environmental constraints against calcium chloride salts and provides improved performance in the field, even at high temperatures and pressures. In this or another embodiment, the fluids of the present invention are "clayless" or "clay-free," meaning that they are made without the addition of organophilic clays or lignites.

The invert emulsion drilling fluids for use in one embodiment of the present invention are mineral oil based systems or mineral oil/paraffin based systems, such as, for example, the INNOVERT® invert emulsion fluid available from Baroid Fluid Services, a Halliburton Company, in Houston, Tex. and Duncan, Okla. which has a paraffin and/or mineral oil base. An example of a commercially available base oil for use in the invention is ESCAID® 110 desulfurized hydrogenated kerosene oil base from ExxonMobil, USA in Houston, Tex. and ExxonMobil Chemical Company in Houston, Tex. In another embodiment, the oleaginous phase of the invert emulsion drilling fluids of the present invention may be a synthetic oil comprising an ester or olefin; a diesel oil; or a mineral oil selected from the group consisting of n-paraffins, iso-paraffins, cyclic alkanes, branched alkanes, and mixtures thereof.

In one embodiment, the internal phase of the invert emulsion drilling fluids of the present invention may contain some water but is comprised of at least about 60% aqueous glycerol internal phase, and can contain as much as about 90% glycerol. Having as little as about 40% glycerol in the internal phase or as much as 100% glycerol in the internal phase may also provide the benefits of the present invention. Other alcohols might be substituted for glycerol, alcohols such lower polyhydric alcohols; polyglycerols; and combinations thereof with each other and/or with glycerols, however such substitutions are not preferred.

The internal phase in one embodiment of the invention is "salt-free." As used herein, "salt-free" means without the addition of calcium chloride salts, or known substitutes such as potassium chloride, sodium chloride, magnesium sulfate, potassium acetate or formate. Nevertheless, such a "salt-free" fluid of the invention is tolerant of such salts that may enter the fluids in insubstantial quantities, that is, in quantities less than about three pounds per barrel, as may occur, for example, in use in the field as when the fluid of the invention is mixed with recycled drilling fluids. The fluids of the invention, however, behave more like traditional fluids when quantities greater than about three pounds per barrel of salts are present.

The invert emulsion drilling fluids of the present invention contain a suspension agent comprising a combination of a hydrophobic amine, such as, for example, a dimer diamine or a fatty dimer diamine, and a short chain organic acid, such as, for example, citric acid. In one embodiment, this combination comprises a 36 carbon fatty dimer diamine and citric acid. A preferred 36 carbon fatty dimer diamine has the following molecular structure:

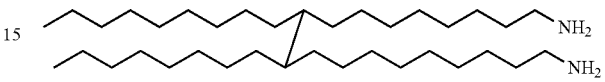

The hydrophobic amine additive may have the following general structure:

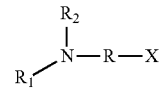

where R is a hydrophobic or partially hydrophobic group with carbon atoms ranging from about 16 to about 54, straight chained or branched, and aliphatic, cycloaliphatic or aryl aliphatic; N is a primary, secondary or tertiary amine wherein the R1 and R2 groups may be the same or different and are selected from the group consisting of a hydrogen group, alkyl group, cyano alkyl group, amino alkyl group, amino aryl group, hydroxyl alkyl group or a derivative thereof; alternatively the R1 and R2 can be a carbonyl group, carbonate group, alkoxy group, hydroxyl group or a derivative thereof; X comprises a hydrophilic group such as an amine which can be primary, secondary or tertiary with substituents being a hydrogen group, alkyl group, cyano alkyl group, amino alkyl group, amino aryl group, hydroxyl alkyl group or a derivative thereof; alternatively the X group can be an amide group, amine oxide group, betaine group, ester group, carboxylic acid group, ether group, hydroxyl group, phosphate group, phosphonate group, pyrrolidone group, haloformyl group, nitrate group, nitrite group, sulfate group, sulfonate group, imidazoline group, pyridine group, sugar group, or a combination or derivative thereof. The organic acid may contain at least one COOH group and may be selected from the group consisting of: lactic acid, formic acid, acrylic acid, acetic acid, chloroacetic acid, dichloroacetic acid, trichloroacetic acid, trifluoroacetic acid, propanoic acid, butyric acid, pentanoic acid, hexanoic acid, heptanoic acid, oxalic acid, malonic acid, succinic acid, glutaric acid, adipic acid, pimelic acid, suberic acid, azelaic acid, sebacic acid, maleic acid, fumaric acid, aspartic acid, citric acid, isocitric acid, aconitic acid, tartaric acid, benzoic acid, p-amino benzoic acid, phthalic acid, terephthalic acid, and trimesic acid. In one embodiment, the organic acid has at least 0.1% w/w solubility in water at 20° C.

The exact formulations of the invert emulsion drilling fluids of the invention vary with the particular requirements of the subterranean formation. An example formulation of an invert emulsion drilling fluid of the invention and results of laboratory tests with same are set forth in Table 1 below to demonstrate the effectiveness of the invention.

Experiments

Except where noted otherwise, all products in Table 1 are available from Halliburton Energy Services, Inc. in Houston, Tex. and Duncan Okla., including:

ADAPTA® crosslinked copolymer for HTHP filtration control;

BAROID® weighting agent, which is ground barium sulfate;

BDF™ 570 dimer diamine rheology modifier.

EZ MUL® NT emulsifier, which is a polyaminated fatty acid;

FACTANT® emulsifier, which is a highly concentrated tall oil derivative which provides HTHP filtration control and emulsion stabilization;

RHEMOD™ viscosifier, which is a modified fatty acid that is used to provide suspension and viscosity in non-aqueous drilling fluids;

TAU-MOD™ viscosifying/suspension agent, which is an amorphous/fibrous material; and ESCAID® 110 oil, which is a desulfurized hydrogenated kerosene low toxicity oil containing less than 0.1% sulfur and less than 1% aromatics, and which is available from ExxonMobil Company, U.S.A., Houston, Tex., and ExxonMobil Chemical Company, Houston, Tex.

Table 1 provides various formulations of invert emulsion drilling fluids prepared with ESCAID® 110 oil base (comprising desulfurized hydrogenated kerosene-$C_{11}$-$C_{14}$ hydrocarbons: n-alkanes, isoalkanes, cyclics, <2% aromatics), and an internal phase having 60% glycerol with the remainder water. Fluid 1 in Table 1 is a "control" prepared according to prior art drilling fluids, that is, an invert emulsion drilling fluid prepared with ESCAID® base oil and an aqueous internal phase comprising glycerol, with a commercially available amorphous/fibrous material for a suspension agent and a fatty dimer diamine rheology modifier. Fluid 2 in Table 1 has the same formulation as Fluid 1 except that Fluid 2 also includes a commercially available modified fatty acid viscosifier. Fluid 3 is an example formulation of a fluid of the invention, comprising the components of Fluid 1 but also comprising citric acid as a suspension agent, instead of the commercially available modified fatty acid viscosifier.

Thus, Table 1 below provides an example formulation and properties for the clay-free, salt-free, invert emulsion drilling fluid of the invention and compares it to the "control," a clay-free invert emulsion drilling fluid with glycerol in the internal phase and without a short chain acid in combination with a fatty dimer diamine additive. Table 1 also compares the formulation using a commercially available modified fatty acid viscosifier with the fatty dimer diamine additive instead of the short chain acid.

In determining the properties set forth in Table 1, samples of the fluids were sheared in a commercial blender at 7,000 rpm for the time indicated in the Table and then rolled at 250° F. for 16 hours, and then stirred for 10 minutes. Measurements were taken with the fluids at 120° F., except where indicated otherwise. The measurements indicate the fluids of the invention provide stable invert emulsions and have good rheological properties for drilling. Moreover, the fluids of the invention are able to overcome the common prior art problem of invert emulsion drilling fluids comprising alcohol for the aqueous phase.

TABLE 1

Formulation of 12ppg mineral oil/paraffin based invert emulsion drilling fluids containing aqueous glycerol as the internal phase (OWR 70:30)

| | Time, min | Fluid 1 | Fluid 2 | Fluid 3 |
|---|---|---|---|---|
| ESCAID ® 110, ppb | | 152.50 | 151.03 | 151.00 |
| EZ MUL ® NT, ppb | 2 | 11.00 | 11.00 | 11.00 |
| FACTANT ®, ppb | 2 | 1.00 | 1.00 | 1.00 |
| LIME, ppb | 2 | 1.30 | 1.30 | 1.30 |
| RHEMOD ™ L, ppb | 2 | 0.00 | 2.50 | 0.00 |
| ADAPTA ®, ppb | 5 | 4.00 | 4.00 | 4.00 |
| 60% aq. Glycerol, ppb | 2 | 88.8 | 88.8 | 88.00 |
| Citric acid, ppb | 2 | 0.00 | 0.00 | 2.50 |
| TAU-MOD ®, ppb | 2 | 5.00 | 5.00 | 5.00 |
| Revdust, ppb | 2 | 20.00 | 20.00 | 20.00 |
| BAROID ®, ppb | 10 | 217.00 | 219.00 | 217.00 |
| BDF ™ 570, ppb | 5 | 1.00 | 1.00 | 1.00 |
| Hot rolled at 250 F., 16 hrs; Rheology @ 120 F. | | | | |
| 600 rpm | | Barite bed | Barite bed | 72 |
| 300 rpm | | | | 43 |
| 200 rpm | | | | 32 |
| 100 rpm | | | | 21 |
| 6 rpm | | | | 7 |
| 3 rpm | | | | 6 |
| PV | | | | 29 |
| YP | | | | 14 |
| LSYP | | | | 5 |
| GELS 10 sec | | | | 7 |
| GELS 10 min | | | | 12 |
| HTHP, ml/30 min (250 F.) | | | | 2.8 |

Other additives to comprise a complete drilling fluid may also be used so long as the additives do not include organophilic clays or lignites, and do not include sodium chloride or known sodium chloride salt substitutes such as potassium chloride, calcium chloride, magnesium sulfate, potassium acetate, or formate. Typical additives suitable for use in drilling fluids of the present invention include, for example: additives to reduce or control temperature rheology or to provide thinning, for example, additives having the tradenames COLDTROL®, ATC®, and OMC2™; additives for enhancing viscosity, for example, an additive having the tradename RHEMOD L™; additives for providing temporary increased viscosity for shipping (transport to the well site) and for use in sweeps, for example, an additive having the tradename TEMPERUS™ (modified fatty acid); additives for filtration control, for example, additives having the tradename ADAPTA®; emulsifier activators like lime, additives for high temperature high pressure control (HTHP) and emulsion stability, for example, additives having the tradename FACTANT™ (highly concentrated tall oil derivative); and additives for emulsification, for example, additives having the tradename LE SUPERMUL™ (polyaminated fatty acid). All of the aforementioned trademarked products are available from Halliburton Energy Services, Inc. in Houston, Tex., U.S.A. and Duncan Okla., U.S.A.

The invert emulsion drilling fluids of the present invention advantageously afford suspension properties superior to those commonly seen with invert emulsion drilling fluids comprising alcohol in the aqueous phase. Simultaneously, the invert emulsion drilling fluids of the present invention are environmentally compatible or "eco-friendly." Testing of formulations of the invention such as Fluid 3 in Table 1 above, in a bioassay laboratory in Houston, Tex., indicated that the BDF 570 fatty dimer diamine additive is North Sea compliant, being biodegradable (66.5% and 82.1% in 28 days and 35 days respectively) and shows low ecotoxicity (48-hr LC50 of >10 g/L, 96-hr LC50 of >10 g/L and a 96-hr NOEC of 10 g/L to the marine juvenile fish Cyprinodont variegates; 24-hr LC50, 48-hr LC50, 48-hr LC90 of >10 g/L and a 48-hr NOEC of 10 g/L for marine copepod Acartia Tonsa). Citric acid is listed in the PLONOR list of additives and hence can be used in environmentally sensitive areas. Thus, the suspension agent of the invention as taught herein is or can be made to be biodegradable or compatible with government environmental regulations in effect as of May 8, 2012.

As indicated above, the advantages of the methods of the invention may be obtained by employing a drilling fluid of the invention in drilling operations. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures. As with other "clay free" drilling fluid, the fluids of the invention afford real-time monitoring and rapid adjustment of the fluid to accommodate changes in such subterranean formation conditions. Further, the fluids of the invention may be recycled during a drilling operation such that fluids circulated in a wellbore may be recirculated in the wellbore after returning to the surface for removal of drill cuttings for example. The drilling fluid of the invention may even be selected for use in a drilling operation to reduce loss of drilling mud during the drilling operation and/or to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:

1. An invert emulsion drilling fluid for drilling in a subterranean formation comprising:
   an oleaginous continuous phase;
   an internal phase comprising alcohol, wherein the alcohol in the internal phase comprises at least about 40% by weight of the internal phase; and
   a suspension agent comprising a hydrophobic amine and an organic acid;
   wherein the organic acid is selected from the group consisting of: lactic acid, formic acid, acrylic acid, acetic acid, chloroacetic acid, dichloroacetic acid, trichloroacetic acid, trifluoroacetic acid, propanoic acid, butyric acid, pentanoic acid, hexanoic acid, heptanoic acid, oxalic acid, malonic acid, succinic acid, glutaric acid, adipic acid, pimelic acid, suberic acid, azelaic acid, sebacic acid, maleic acid, fumaric acid, aspartic acid, citric acid, isocitric acid, aconitic acid, tartaric acid, benzoic acid, p-amino benzoic acid, phthalic acid, terephthalic acid, trimesic acid, and any combination or derivative thereof,
   wherein the hydrophobic amine is a 36 carbon fatty dimer diamine with the molecular structure:

2. The invert emulsion drilling fluid of claim 1 wherein the organic acid contains at least one COOH group.

3. The drilling fluid of claim 1 wherein the organic acid has at least 0.1% w/w solubility in water at 20° C.

4. The drilling fluid of claim 1 wherein the fluid is substantially free of calcium chloride, potassium chloride, sodium chloride, magnesium sulfate, potassium acetate and formate.

5. The drilling fluid of claim 1 wherein the fluid is substantially free of organophilic clays and lignites.

6. The drilling fluid of claim 1 wherein the oleaginous phase comprises: a synthetic oil comprising an ester or olefin; a diesel oil; or a mineral oil selected from the group consisting of: n-paraffins, iso-paraffins, cyclic alkanes, branched alkanes, and any combination or derivative thereof.

7. The drilling fluid of claim 1 wherein the internal phase further comprises water.

8. An invert emulsion drilling fluid for drilling in a subterranean formation comprising:
   an oleaginous continuous phase;
   an internal phase comprising at least about 40% by weight glycerol by weight of the internal phase;
   lime; and
   a suspension agent comprising a combination of a 36 carbon fatty dimer diamine and citric acid, wherein the 36 carbon fatty dimer diamine is a dimer with the molecular structure:

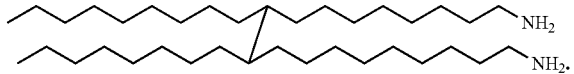 [SMILES: CCCCCCCCCC(CCCCCCCCN)C(CCCCCCCC)CCCCCCCCCN]

9. The drilling fluid of claim 8 wherein the suspension agent is biodegradable.

10. The invert emulsion drilling fluid of claim 1, further comprising lime.

11. The invert emulsion drilling fluid of claim 10, wherein the fluid comprises more of the lime than the hydrophobic amine by weight.

12. The invert emulsion drilling fluid of claim 1, wherein the organic acid is selected from the group consisting of: lactic acid, formic acid, acrylic acid, acetic acid, chloroacetic acid, dichloroacetic acid, trichloroacetic acid, trifluoroacetic acid, propanoic acid, butyric acid, pentanoic acid, hexanoic acid, heptanoic acid, oxalic acid, malonic acid, succinic acid, glutaric acid, pimelic acid, suberic acid, azelaic acid, sebacic acid, maleic acid, fumaric acid, aspartic acid, isocitric acid, aconitic acid, tartaric acid, benzoic acid, p-amino benzoic acid, phthalic acid, terephthalic acid, trimesic acid, and any combination or derivative thereof.

* * * * *